United States Patent
Srinidhi et al.

(10) Patent No.: US 7,019,761 B2
(45) Date of Patent: Mar. 28, 2006

(54) METHODS FOR AUTO-SEPARATION OF TEXTS AND GRAPHICS

(75) Inventors: Kadagattur Srinidhi, Acton, MA (US); Fred W. Andree, Brookline, MA (US)

(73) Assignee: Zoran Corporation, Sunnyvale, CA (US)

( * ) Notice: Subject to any disclaimer, the term of this patent is extended or adjusted under 35 U.S.C. 154(b) by 129 days.

(21) Appl. No.: 10/084,626

(22) Filed: Feb. 25, 2002

(65) Prior Publication Data

US 2003/0160802 A1    Aug. 28, 2003

(51) Int. Cl.
*G09G 5/00* (2006.01)

(52) U.S. Cl. .............. 345/643; 345/598; 345/599; 358/2.1; 358/462; 382/113; 382/176; 382/194; 382/201; 382/228

(58) Field of Classification Search ........ 382/176, 382/228, 113, 194; 358/2.1, 462, 464; 345/619, 345/598, 599, 643
See application file for complete search history.

(56) References Cited

U.S. PATENT DOCUMENTS

| | | | | |
|---|---|---|---|---|
| 5,331,442 A | | 7/1994 | Sorimachi | 358/532 |
| 5,502,793 A | * | 3/1996 | Ng | 358/1.9 |
| 6,078,697 A | | 6/2000 | Ng | 382/275 |
| 6,195,459 B1 | * | 2/2001 | Zhu | 382/176 |
| 6,233,353 B1 | * | 5/2001 | Danisewicz | 382/176 |
| 6,466,693 B1 | * | 10/2002 | Otsu et al. | 382/176 |
| 6,529,629 B1 | * | 3/2003 | Li et al. | 382/176 |
| 6,631,210 B1 | * | 10/2003 | Mutoh et al. | 382/176 |
| 6,778,699 B1 | * | 8/2004 | Gallagher | 382/165 |

FOREIGN PATENT DOCUMENTS

| | | |
|---|---|---|
| EP | 0810774 A2 | 3/1997 |
| EP | 0 993 179 A2 | 4/2000 |
| EP | 1 079 599 A2 | 2/2001 |

OTHER PUBLICATIONS

Patent Cooperation Treaty, International Search Report, International Application No. PCT/US 02/05930 mailed on Oct. 29, 2002, 4 pages.
Examination Report for GB0418717.5 dated Feb. 11, 2005.

* cited by examiner

*Primary Examiner*—Matthew C. Bella
*Assistant Examiner*—Antonio Caschera
(74) *Attorney, Agent, or Firm*—Goodwin Procter LLP

(57) ABSTRACT

The present invention is directed to a method of discriminating between textual content and graphical content. The method includes the steps of receiving a plurality of pixel values for a pixel line segment, calculating a plurality of spatial gradients based on the pixel values of adjacent pixels, determining a smoothness index by processing the plurality of spatial gradients, and identifying the pixel line segment as text or graphics by comparing the smoothness index to a threshold value.

6 Claims, 10 Drawing Sheets

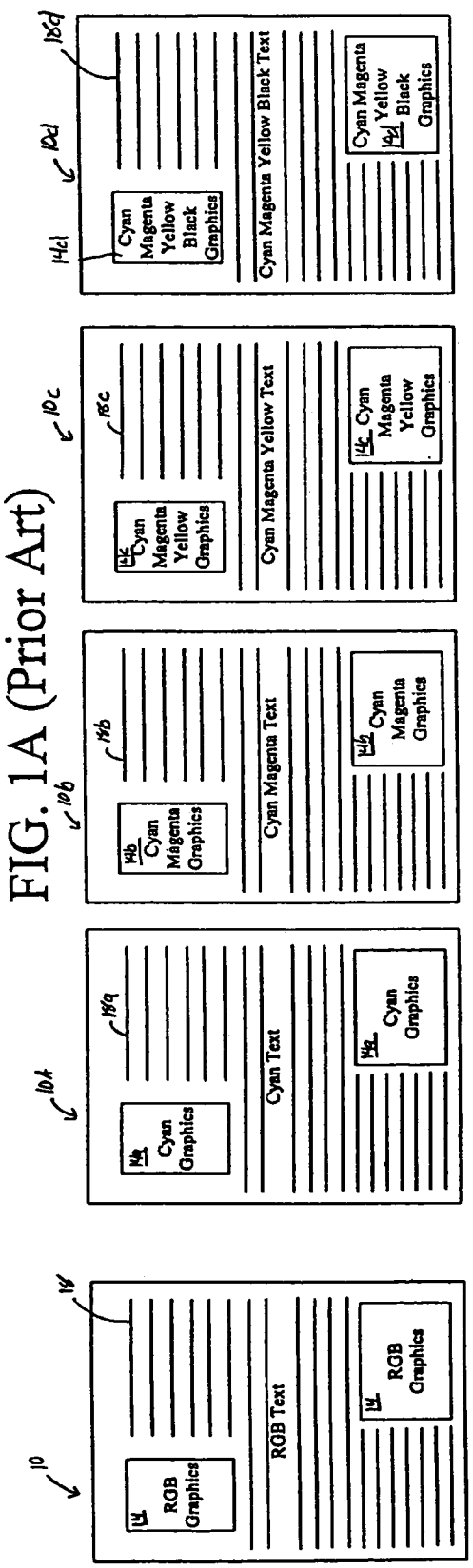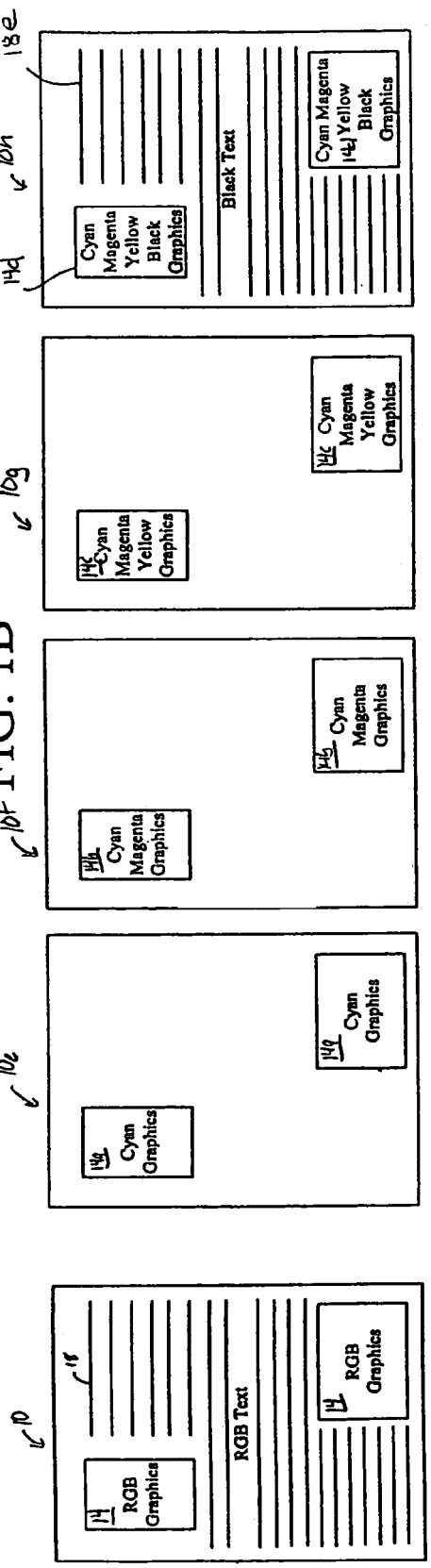

METHODS FOR AUTO-SEPARATION OF TEXTS AND GRAPHICS

FIELD OF THE INVENTION

The invention relates generally to a method of image discrimination and, more specifically, to a method of identifying a pixel line segment as one of text or graphics.

BACKGROUND OF THE INVENTION

Multi-functional peripherals (MFPs) are used to produce digital color copies and to print color documents. MFPs typically generate copies of a document at a slower rate than the rate for printing an original document, because the MFP does not know which portions of the document contain black (e.g., text) and which portions include color (e.g., graphics and photos). Generally, MFPs use multiple color ink cartridges that provide several ink colors (e.g., cyan, magenta, yellow and black). A typical MFP color copying process begins by scanning the document to be copied. With reference to FIG. 1A, the typical document 10 contains red-green-blue (RGB) color images 14 and text 18. The reproduction process includes the step of converting RGB pixel values to cyan-magenta-yellow-black (CMYK) values. The printed copy 10d is the result of four print scans corresponding to the four ink colors. The document 10a resulting from a first print scan includes cyan graphics 14a and cyan text 18a. The next scan deposits magenta ink as depicted in document 10b. Thus graphics 14b and text 18b include magenta ink and cyan ink. The next scan deposits yellow ink as depicted in document 10c. Graphics 14c and text 18c include yellow, magenta and cyan ink. The fourth scan generates the finished copy 10d of the original document 10 and deposits black ink as depicted in document 10d. The copy document 10d includes cyan, magenta, yellow and black ink.

Typically, the text 18 is pure black and only the graphics 14 contain color. As a result, the time needed to copy the document 10 can be reduced if the MFP can discriminate between text pixels and color pixels. Also, the amount of color ink used would be reduced because the color ink would only be used for printing graphics 14. What is needed is an efficient and accurate method of discriminating between text pixels and graphics pixels.

SUMMARY OF THE INVENTION

The present invention is directed to a method of discriminating between textual content and graphical content in an image. The method calculates the smoothness index of a pixel line segment and determines if the pixel line segment is text or graphics. The determination can be used to reduce the printing time and the quantity of ink used to print a document.

In one aspect, the present invention relates to a method for discriminating between textual content and graphical content in an image. The method includes the steps of receiving a plurality of pixel values for a pixel line segment, calculating a plurality of spatial gradients based on pixel values of adjacent pixels, determining a smoothness index by processing the plurality of spatial gradients, and identifying the pixel line segment as one of a text segment or a graphic segment by comparing the smoothness index to a threshold value.

In one embodiment, the step of calculating a plurality of spatial gradients includes the step of subtracting an adjacent pixel value from a current pixel value for each of the plurality of pixel values. In another embodiment, the step of determining the smoothness index includes the steps of calculating a first statistical characteristic of the plurality of spatial gradients, calculating a second statistical characteristic of the plurality of spatial gradients, and dividing the second statistical characteristic by the first statistical characteristic to generate the smoothness index. In a further embodiment, the first statistical characteristic calculation includes squaring each of the spatial gradients to generate a plurality of squared gradients, and generating the first statistical characteristic by summing the squared gradients. In another further embodiment, the second statistical calculation includes generating a plurality of absolute gradients by determining an absolute value of each of the spatial gradients, determining a sum value by summing the absolute gradients, and generating the second statistical characteristic by squaring the sum value.

In another aspect, the invention relates to a method of discriminating between textual content and graphical content in an image. The method includes the steps of receiving a first plurality of pixel values for a pixel line segment and a second plurality of pixel values for the pixel line segment, calculating a plurality of spatial gradients for the pixel line segment based on the first plurality of pixel values, and determining a smoothness index by processing the plurality of spatial gradients. Additionally, the method includes the steps of calculating a value by combining the second plurality of pixel values, and identifying the pixel line segment as one of a text segment or a graphic segment by comparing the smoothness index to a first threshold value and the calculated value of the second plurality of pixel values to a second threshold value.

In one embodiment, the step of calculating a value by combining the second plurality of pixel values includes the step of calculating the maximum of the second plurality of pixel values. In another embodiment, the method includes the steps of receiving a third plurality of pixel values for the pixel line segment and calculating a value by combining the third plurality of pixel values. Additionally, the step of identifying the pixel line segment as one of a text segment or a graphic segment includes comparing the calculated value of the third plurality of pixel values to a third threshold value. In a further embodiment, the step of calculating a value by combining the third plurality of pixel values includes the step of calculating the maximum of the third plurality of pixel values.

BRIEF DESCRIPTION OF THE DRAWINGS

The invention is pointed out with particularity in the appended claims. The advantages of the invention may be better understood by referring to the following description taken in conjunction with the accompanying drawing in which:

FIG. 1A is an illustration demonstrating the generation of a copied document according to a prior art printing process;

FIG. 1B is an illustration demonstrating the generation of a copied document according to a printing process in accordance with the present invention;

DETAILED DESCRIPTION OF THE INVENTION

The present invention is directed to methods of discriminating between text and graphics in a pixel line segment. With reference to FIG. 1B, document 10 includes RGB graphics pixels 14 and text pixels (typically black) 18. After scanning document 10 the RGB values are converted to CMYK values. Cyan ink is deposited (cyan graphics 14$a$), then magenta ink is deposited (magenta graphics 14$b$), and then yellow ink is deposited (yellow graphics 14$c$). Finally, black ink is deposited in graphics 14$d$ and text 18$d$. Document 10$h$, which is a replica of document 10, includes black text 18$e$ and CMYK graphics 14$d$. The graphics 14$a$, 14$b$, 14$c$, and 14$d$, are generated in a similar manner to that described in FIG. 1A. However, the text 18$e$ is only deposited during the generation of document 10$h$.

Figure 2:
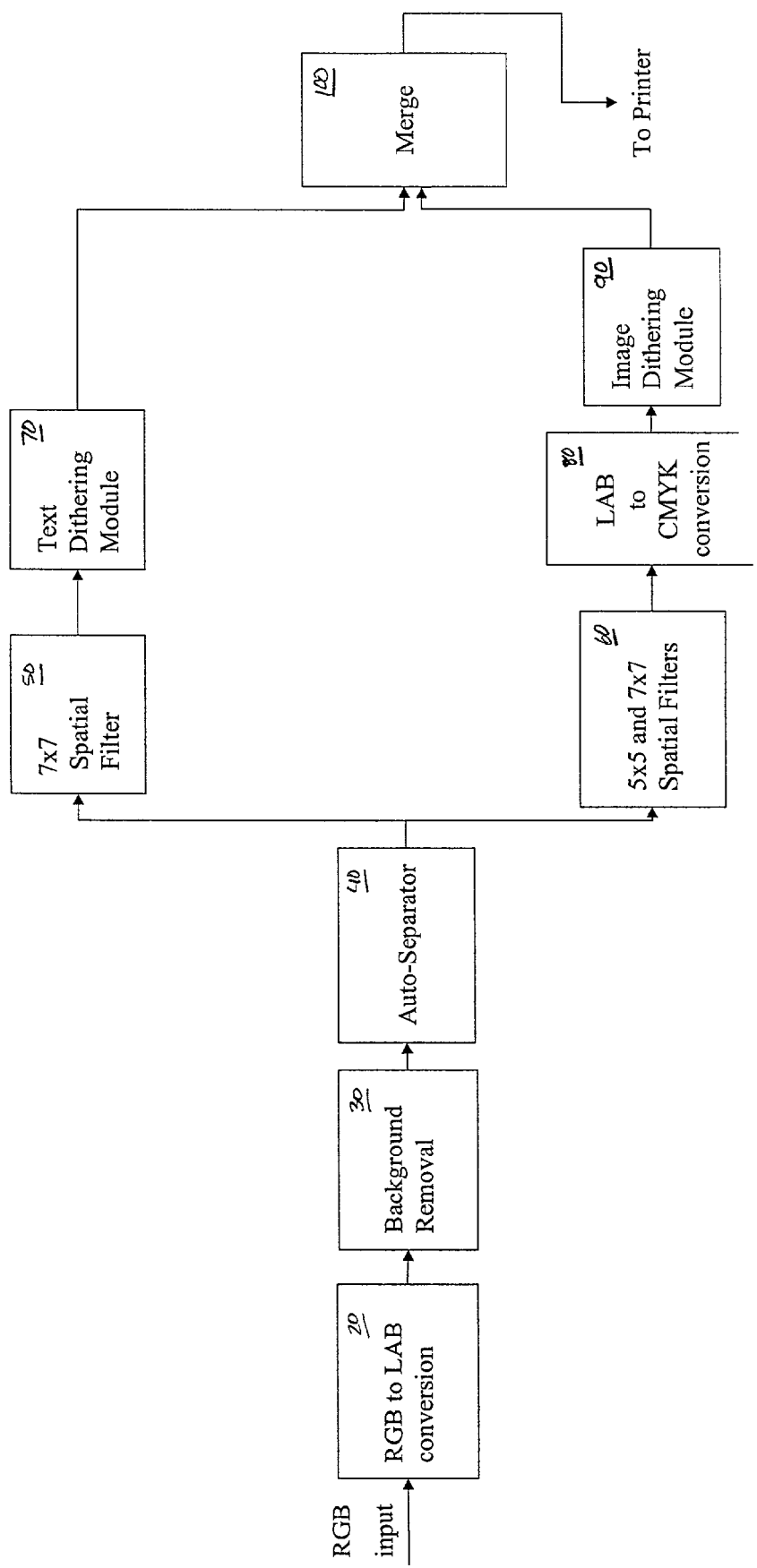
FIG. 2 is a functional block diagram depicting an embodiment of a system incorporating the method of the present invention.

With reference to FIG. 2, RGB to luminance-chrominance-chrominance (LAB) converter 20 receives RGB pixel values from an external source, such as a scanner. Each RGB pixel value is converted to a corresponding LAB value according to a conversion matrix applied by LAB converter 20. The conversion is generally given by $$\begin{bmatrix} a_{00} & a_{01} & a_{02} \\ a_{10} & a_{11} & a_{12} \\ a_{20} & a_{21} & a_{22} \end{bmatrix} \begin{bmatrix} R \\ G \\ B \end{bmatrix} = \begin{bmatrix} L \\ A \\ B \end{bmatrix} \quad (1)$$

where $a_{00}$, $a_{01}$, $a_{02}$, $a_{10}$, $a_{11}$, $a_{12}$, $a_{20}$, $a_{21}$, and $a_{22}$ are transform coefficients defining the conversion.

After conversion to LAB space, the pixel values are communicated to a background remover 30, which converts approximately white pixel values into completely white pixel values. An auto-separator 40 receives the processed LAB data and generates statistical characteristics, such as a smoothness index, for each pixel line segment (i.e., a linear group of pixels) in the processed LAB image. The auto-separator 40 determines whether each pixel line segment is to be processed as text or graphics, and communicates corresponding data to either a text spatial filter 50 or an image spatial filter 60. In a preferred embodiment, each pixel line segment includes thirty-two pixels.

The text spatial filter 50 sharpens segments of the scanned pixel values that were classified as text pixels by the auto-separator 40 using a weighted average to enhanced contrast of pixels from the external pixel source. In one embodiment, text spatial filter 50 includes a symmetric mask for spatially filtering a 7×7 segment of pixels.

A text dithering module 70 receives the filtered pixel values and further processes the pixels by converting data having 8 bits per pixel into bitonal data (one bit per pixel). In other words, text dithering module 70 ensures that pixels that are intended to be black are represented by a "pure black" value. Similarly, pixel values intended to be white are assigned a "pure white" value.

The image spatial filter 60 filters the pixels that were classified as graphics by the auto-separator 40. In one embodiment, image spatial filter 60 includes a symmetric mask for spatially filtering a 5×5 segment of pixels of chrominance values and a 7×7 symmetric mask for filtering the luminance values.

A LAB to CMYK conversion module 80 receives the filtered image pixels and converts the pixel values to the corresponding CMYK values. The CMYK values are then forwarded to an image dithering module 90. The CMYK value are dithered similar to the text pixels described above. A merger module 100 receives the pixel values from the dithering modules 70, 90. The merger module 100 generates merged pixel values for each pixel according to the pixel values provided by the text dithering module 70 and the image dithering module 90. In other words, the merger module 90 constructs the final image to be printed and forwards the final pixel values to a printer.

Figure 3:
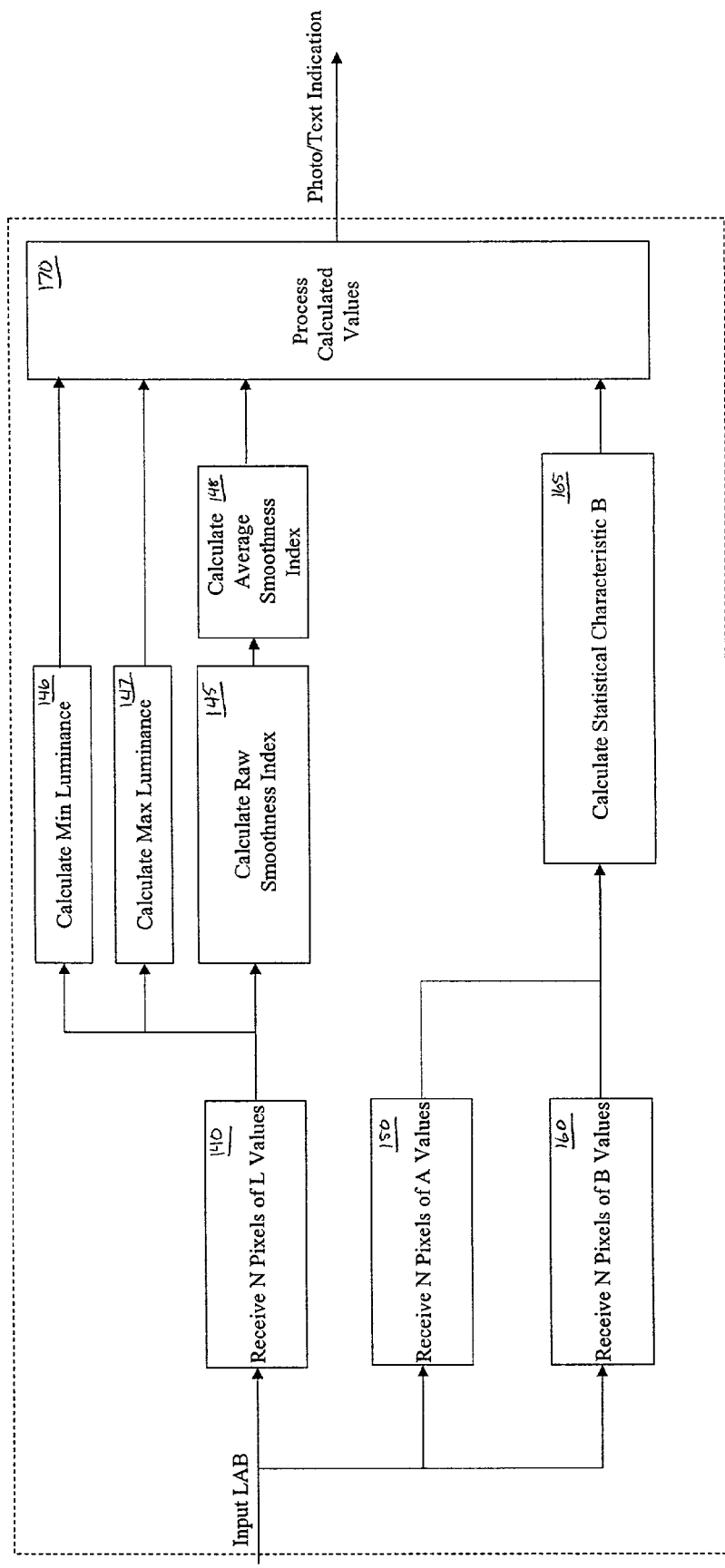
FIG. 3 is flow chart depicting an embodiment of a method for discriminating between textual content and graphical content according to the present invention.

FIG. 3 describes in more detail the function of the auto-separator 40. In step 140, the auto-separator 40 receives a plurality of luminance values (i.e., L values) for a pixel line segment. In this illustrative embodiment, the pixel line segment is composed of thirty-two consecutive pixels (i.e., N=32). A raw smoothness index is calculated from the luminance values in step 145. In steps 146 and 147 the minimum and the maximum of the luminance values are calculated, respectively. In step 148, the average smoothness index is calculated. In step 150, the auto-separator 40 receives a first plurality of chrominance values (e.g., A values) for the pixel line segment. In step 160, the auto-separator 40 receives a second plurality of chrominance values (e.g., B values) for the pixel line segment. A statistical characteristic of the A and B pixel values is determined in step 165. In one embodiment, the statistical characteristic is the maximum non-neutral color (NNC) of the pixel line segment. In a further embodiment, the maximum non-neutral color of the pixel line segment is determined by:

$$NNC = \max[abs(A-128) + abs(B-128)] \quad (2)$$

for each pixel line segment. The full scale range of the A and B values is 0–256. Finally, in step 170, the average smoothness index, the maximum luminance, the minimum luminance, and the statistical characteristic of the A and B values are processed to classify the pixel line segment as text or image.

Figure 4:
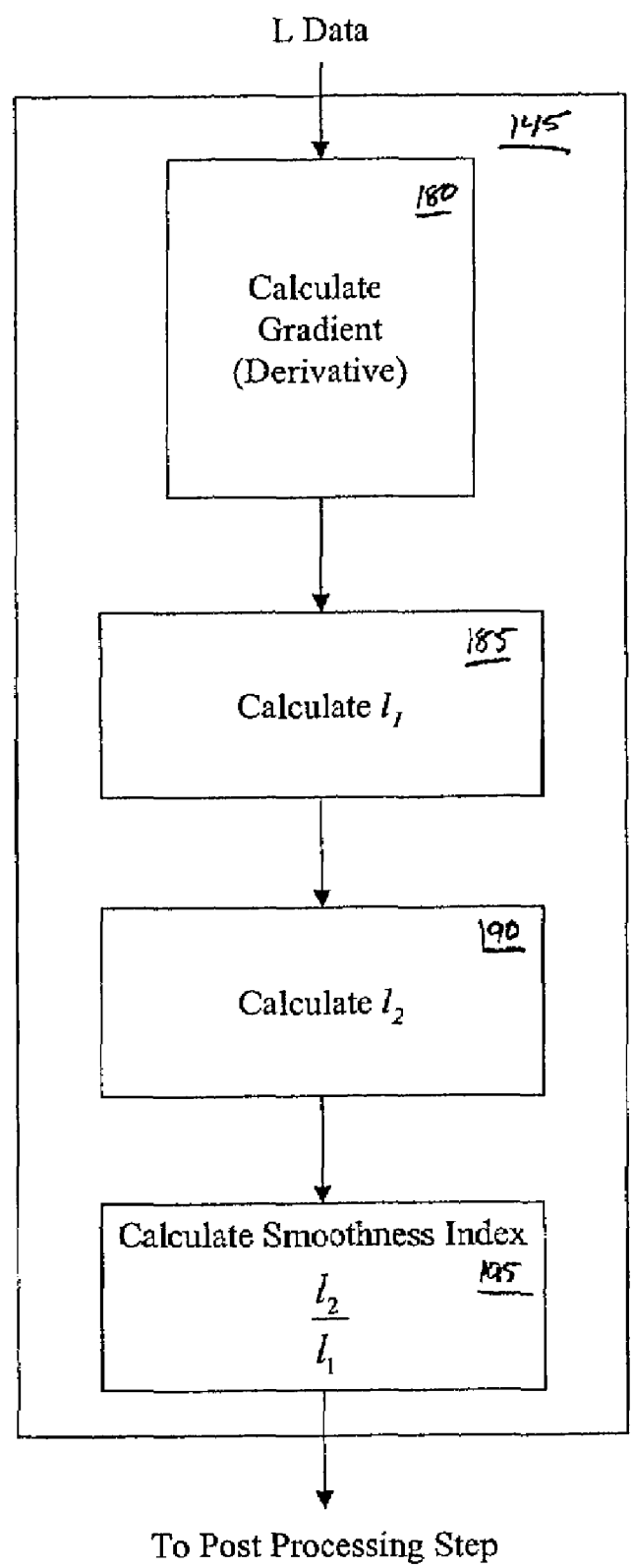
FIG. 4 is a flow chart depicting an embodiment of a smoothness index calculation used to discriminate between textual content and graphical content in accordance with the present invention.
Figure 5A:
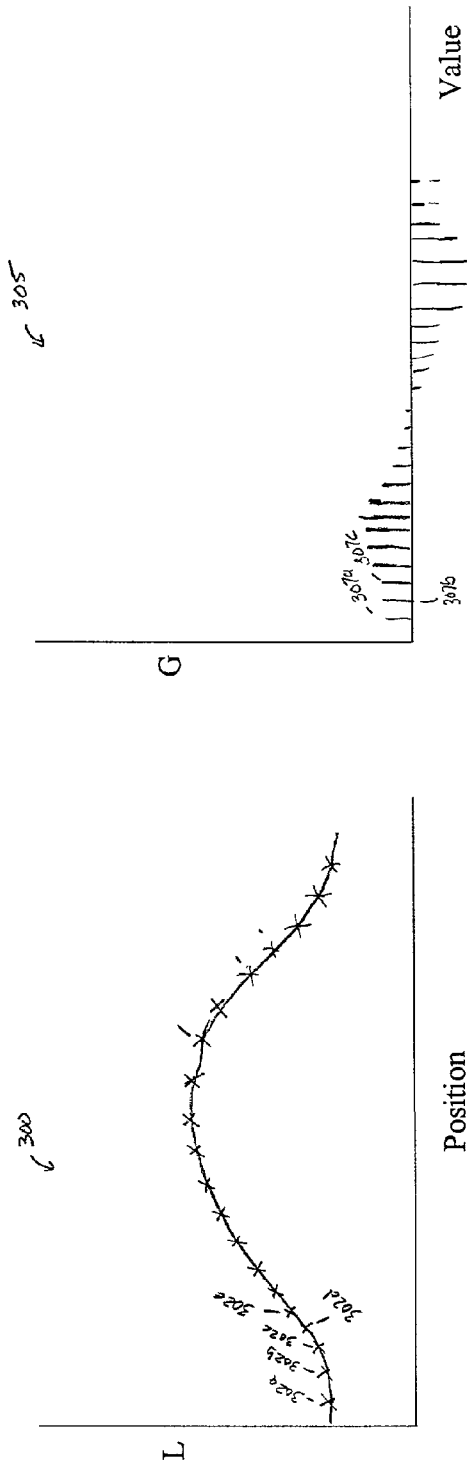
FIG. 5A is a plot of luminance as a function of position and a plot of the corresponding spatial gradients for a typical graphics segment.
Figure 5B:
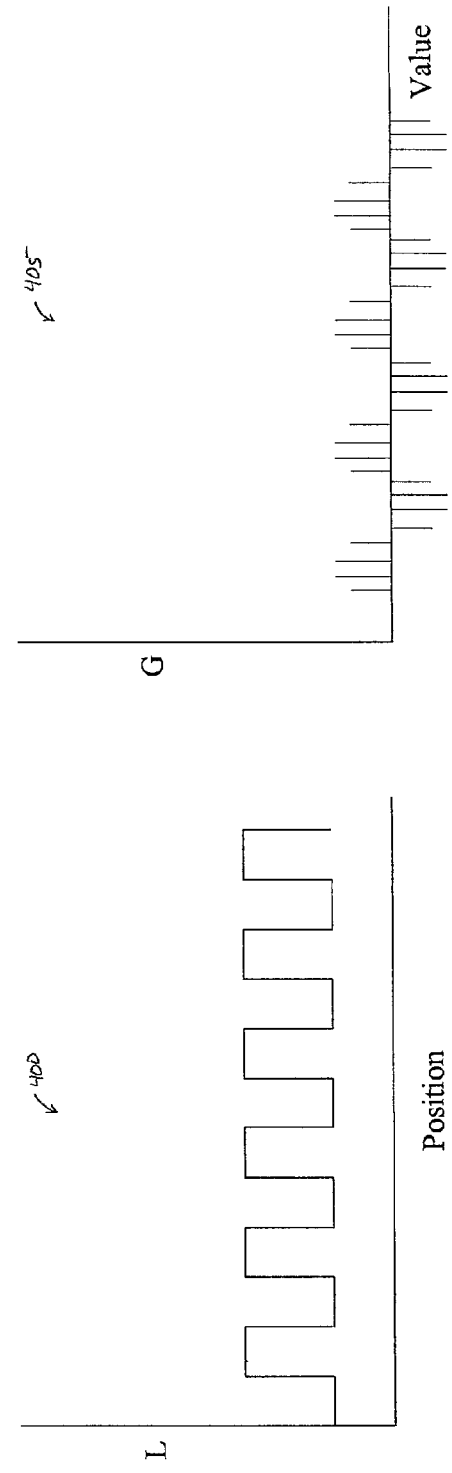
FIG. 5B is a plot of luminance as a function of position and a plot of the corresponding spatial gradients for a typical text segment.

A more detailed description of the raw smoothness index calculation is now provided with reference to FIGS. 4 and 5. FIG. 4 depicts steps used in calculating the raw smoothness index (step 148). In step 180, a plurality of spatial gradients are derived from the L pixel values. Plot 300 of FIG. 5 depicts an illustrative example of L pixel values 302$a$, 302$b$, 302$c$, . . . (referred to generally as 302) as a function of corresponding pixel position in a pixel line segment having graphical content. Plot 305 depicts the corresponding spatial gradients 307*a*, 307*b*, 307*c*, . . . (referred to generally as 307) derived from plot 300. In one embodiment, each spatial gradient 307 is determined by subtracting a subsequent pixel value from the current pixel value. For example, the gradient for the first pixel in the line segment is the L value at point 302*b* minus the L value at point 302*a*. An illustrative example is provided in FIG. 5B for a pixel line segment having textual content. Plot 405 depicts the corresponding spatial gradients derived from plot 400. In an illustrative embodiment, the first statistical characteristic ($l_1$) of the plurality of spatial gradients calculated in step 185 is given by:

$$l_1 = \sum_1^N (gradient\ i^2) \quad (3)$$

The second statistical characteristic ($l_2$) of the plurality of spatial gradients is calculated in step 190. In the illustrative embodiment, the second statistical characteristic ($l_2$) is calculated to be the square of the sum of the absolute values of the spatial gradients. The second statistical characteristic ($l_2$) is given in equation form by:

$$l_2 = \left(\sum_1^N |(gradient\ i)|\right)^2 \quad (4)$$

The value of the smoothness index is calculated in step 195. The smoothness index, in the illustrative embodiment is equal to the second statistical characteristic ($l_2$) divided by the first statistical characteristic ($l_1$), or equivalently:

$$\frac{\left(\sum_1^N |(gradient\ i)|\right)^2}{\sum_1^N (gradient\ i^2)} \quad (5)$$

The raw smoothness index value for each pixel line segment is averaged with its neighbors to generate an average smoothness index for the pixel line segment. The raw smoothness index of the pixel line segment often accurately classifies the pixel line segment as graphics or text, but sometimes the raw smoothness index is misleading. Averaging the raw smoothness index value for a pixel line segment among its neighboring segments can yield a more accurate classification. For example, the smoothness index is high when all the gradients are approximately equal (e.g., 32 gradients of the same value results in a smoothness index of 32). Examples include photographic images in which all the gradient values are usually small and halftones images in which all the gradient values are usually large. Text pixel segments can also yield gradients of approximately equal values if the entire pixel line segment is contained in the horizontal stroke of a character or horizontal rule. In this case, the smoothness index of the block improperly indicates that the pixel line segment is an image. Typically, a majority of the surrounding pixel line segments are properly classified as text, and an averaging operation generally corrects the classification.

The smoothness index is low when a few gradients are much larger than the other gradients in the pixel line segment. For example, if there are two large identical gradients in the pixel line segment and the remaining gradients are zero, the smoothness index is 2. This situation arises, for example, if the pixel line segment crosses the stem of a character. A large gradient results for each transition from black to white, or white to black, at the edges of the stem. This phenomenon also exists at a sharp light to dark edge in a photo or halftone image. In these situations, the smoothness index improperly classifies the pixel line segment as text. Typically, a majority of the surrounding pixel line segments will be properly classified as images and, therefore, an averaging operation corrects the improper classification.

Figure 6:
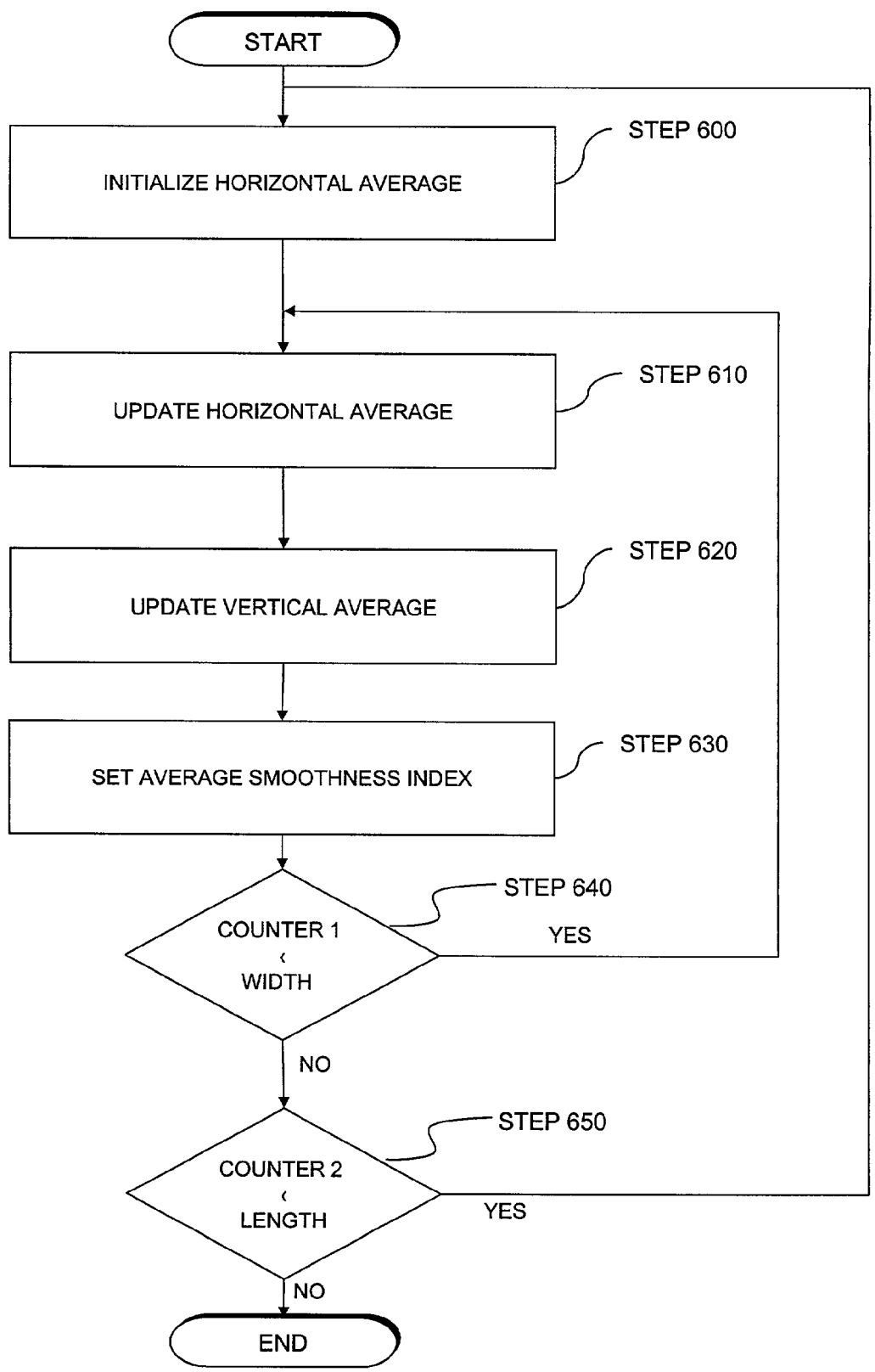
FIG. 6 is a flow chart depicting the processes of averaging the smoothness indexes step of FIG. 3.
Figure 7A:
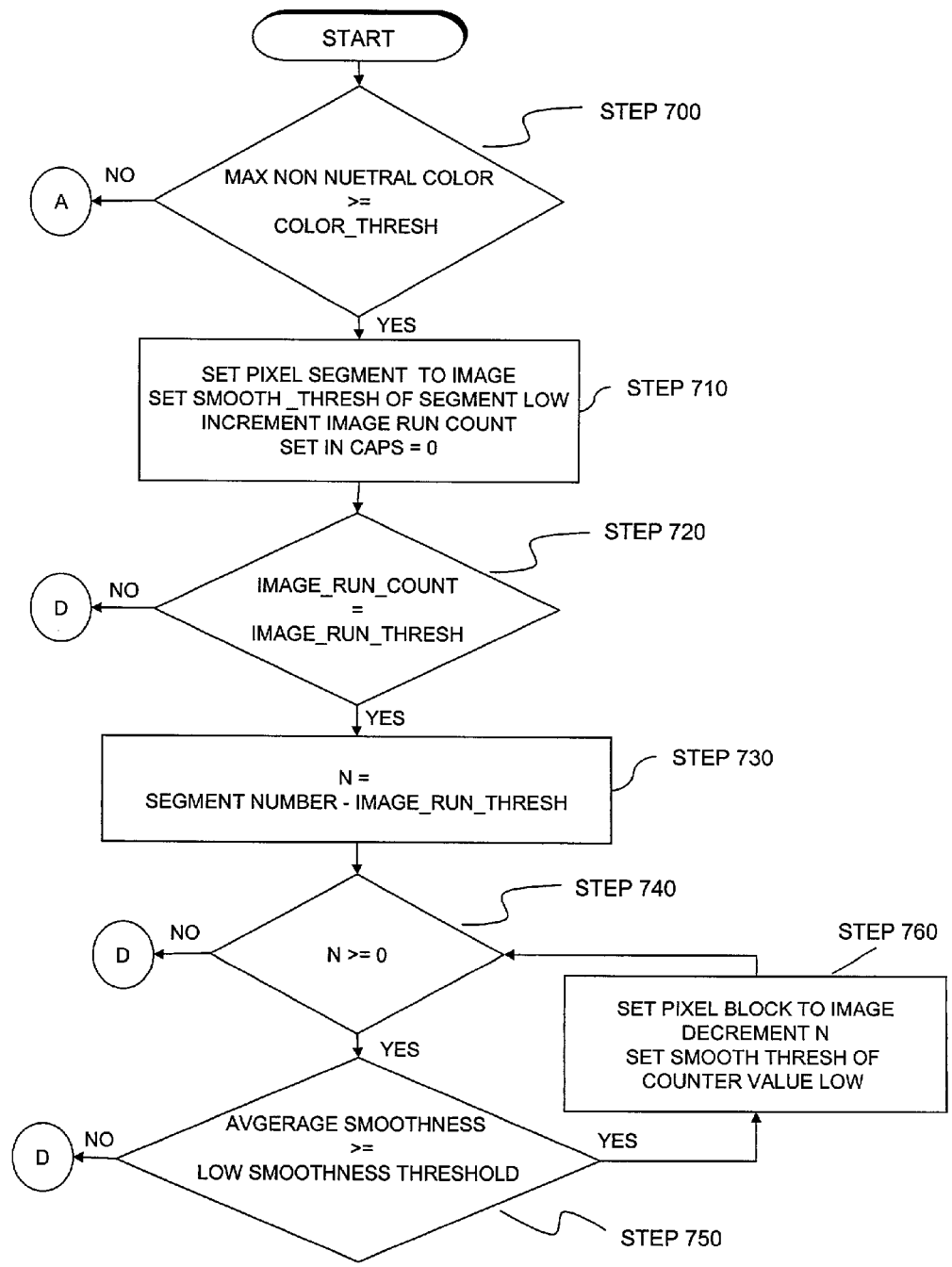
FIG. 7A is flow chart describing an embodiment of the post processing step of FIG. 3.
Figure 7B:
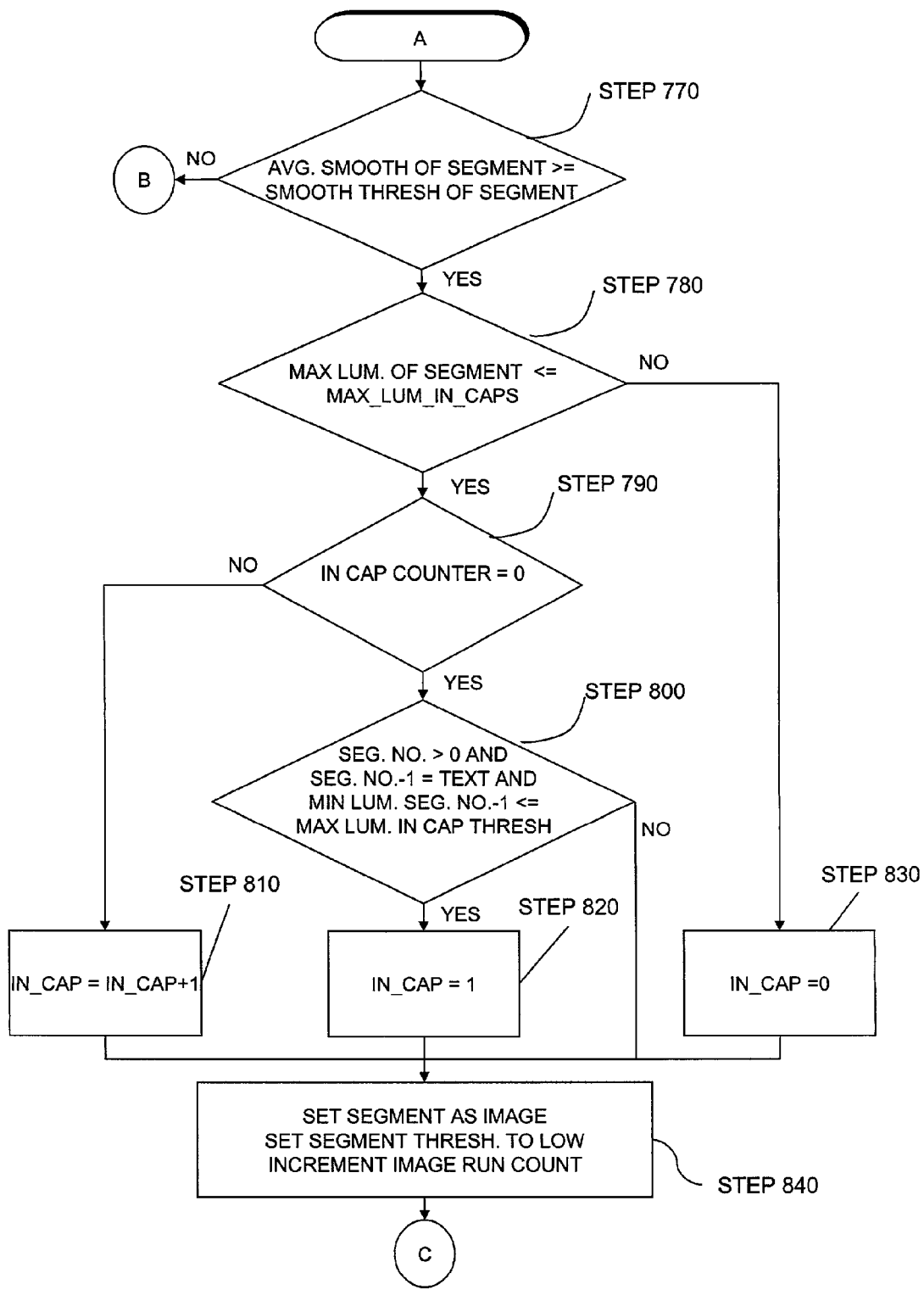
FIG. 7B is flow chart describing an embodiment of the post processing step of FIG. 3.
Figure 7C:
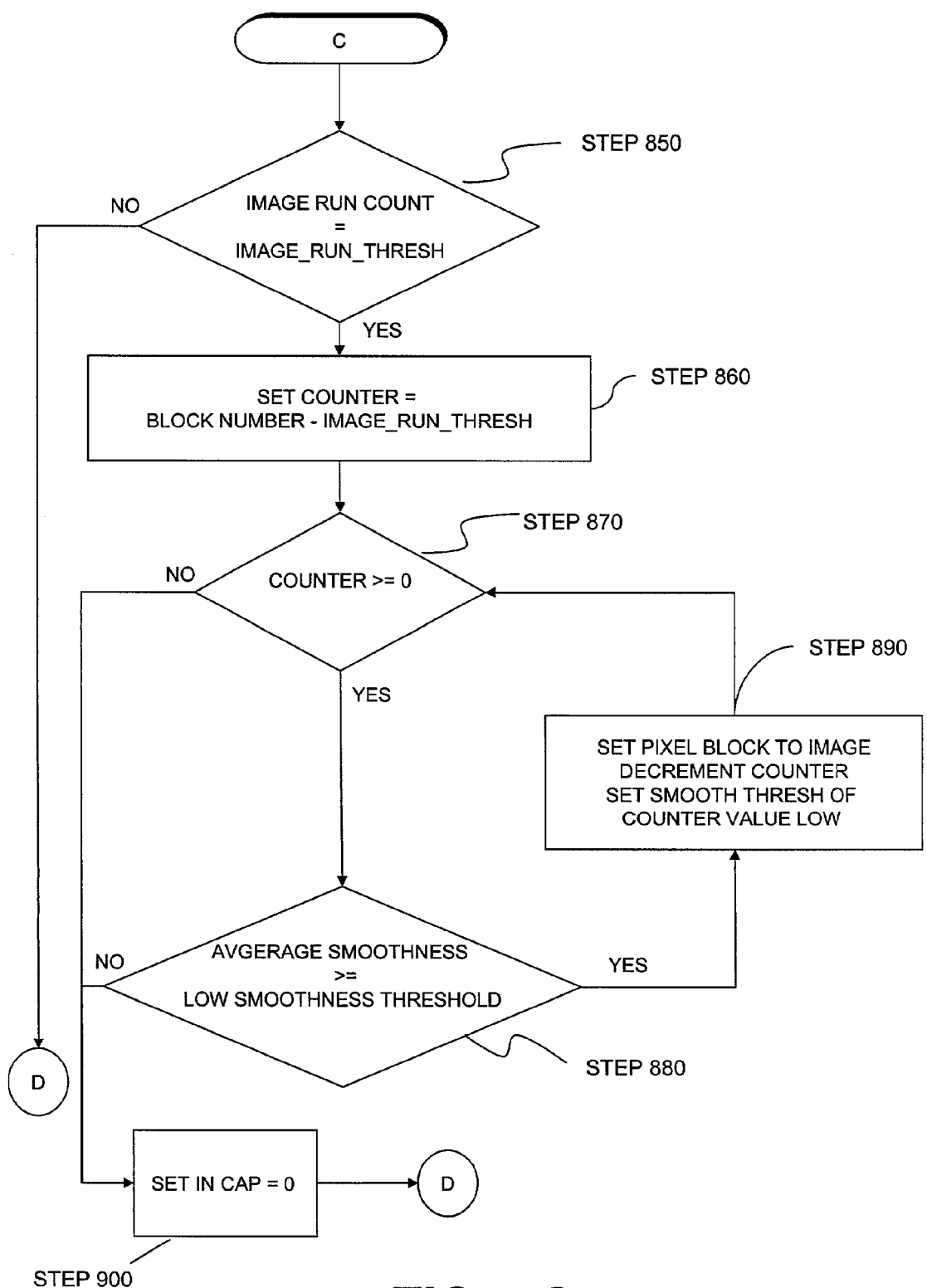
FIG. 7C is flow chart describing an embodiment of the post processing step of FIG. 3.
Figure 7D:
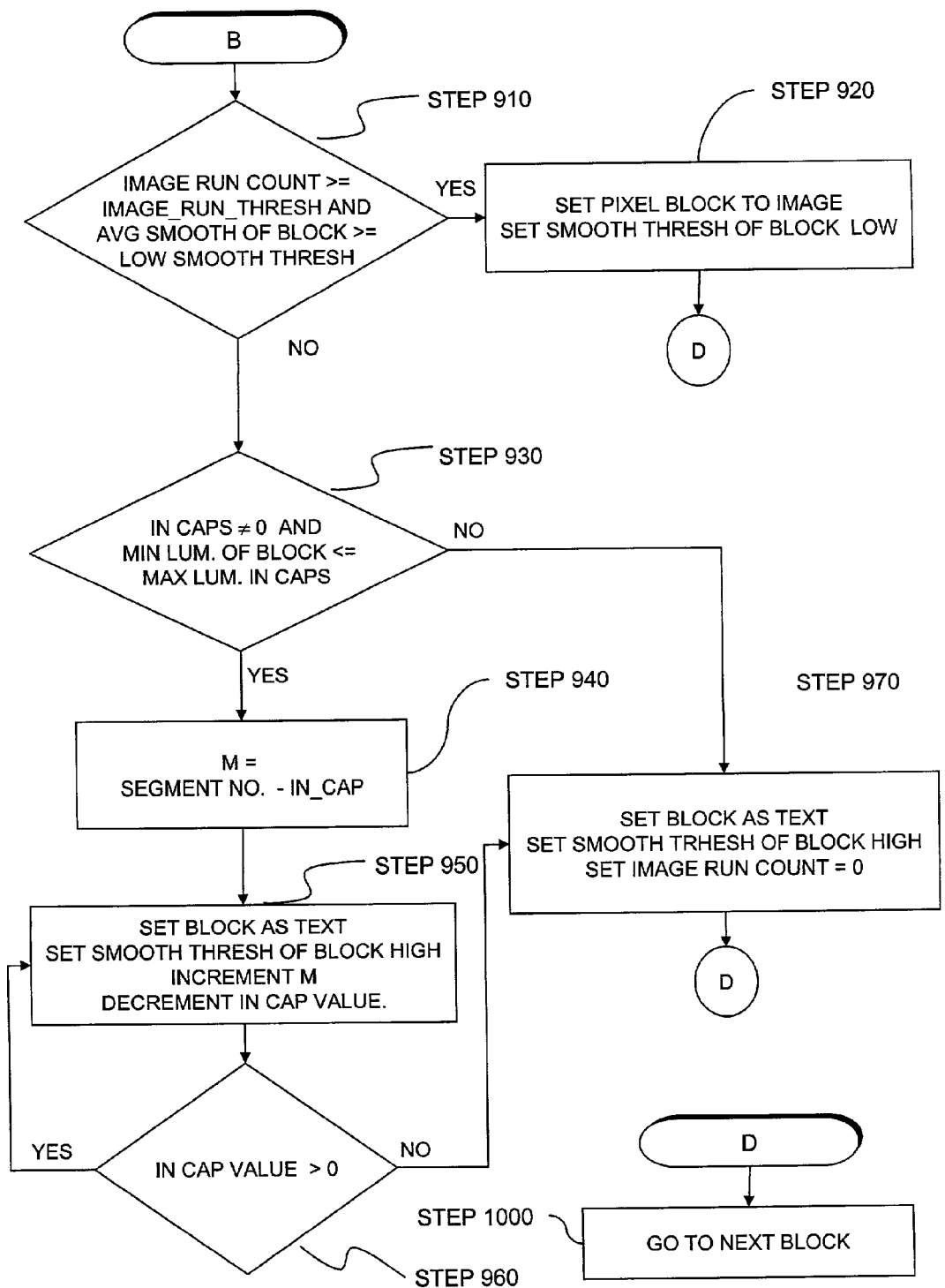
FIG. 7D is flow chart describing an embodiment of the post processing step of FIG. 3.

FIG. 6 depicts in more detail the step of calculating of the average smoothness index 148 of FIG. 3. The process assumes that raw smoothness index values have been generated for each pixel line segment of the document. Generally, a weighted running average in both the horizontal and vertical page directions is used to generate the average smoothness index for each of the pixel line segments. The process iterates through each pixel line segment in the horizontal direction and vertical direction. In other words, the average runs across the page and then down the page.

In step 600, the horizontal average is initialized by weighting (e.g., doubling) the raw smoothness index value of the left most pixel line segment on the page in the first row of pixel line segments. In step 610, the horizontal average for the first pixel line segment is updated by halving the current average value and adding it to the raw smoothness index of the pixel line segment to the right. In step 620, the average vertical smoothness index is update by weighting (e.g., multiplying by seven-eighths) the current average vertical smoothness index and adding it the current value of the average horizontal smoothness index. In step 630, the average smoothness index for the pixel line segment is set.

In step 640 a page width location determination is made by comparing a first counter COUNTER_1 with a page width threshold WIDTH. The first counter represents the horizontal position of the pixel line segment. If the first counter COUNTER_1 is less than the page width threshold WIDTH, the process returns to step 610 because the process has not reached the right edge of the page. If the first counter COUNTER_1 is greater than or equal to the page width threshold WIDTH, the process continues to step 650.

In step 650 a page length location determination is made by comparing a second counter COUNTER_2 with a page length threshold LENGTH. The second counter represents the vertical position of the pixel line segment. If the second counter COUNTER_2 is less than the page length threshold LENGTH, the process returns to step 600 because the process has not reached the bottom row of the page. If the second counter COUNTER_2 is greater than or equal to the page length threshold LENGTH, the averaging process ends and the processing of calculated values (step 170 of FIG. 3) begins.

In an exemplary embodiment, the following C code is used to generate the average smoothness index values for the pixel line segments:

```
int raw_smooth[height][width];        /*raw smoothness values*/
int avg_smooth[height][width];        /*averaged smoothness values*/
int vert_avg_smooth[width];           /*vertical averaged smoothness*/
int y,x;                              /*row number and column number*/
int hav;                              /*horizontal average*/
memset(vert_avg_smooth,0,width);      /*clear vertical averages*/
for(y=0;y<height;++y)                 /*loop over rows/
{
    hav = raw_smooth[y][0]*2;         /*init horizontal average*/
        for(x=0;x<width;++x)
        {
        hav = hav/2 + raw_smooth[y][x+1]; /*update horizontal avg*/
        vert_avg_smooth[x] = vert_avg_smooth[x]*7/8 + hav; /*update vertical avg*/
        if(y>=8)
            avg_smooth[y-8][x] = vert_avg_smooth[x]; /*set averaged smoothness*/
        }
}
```

Many images have regions with low smoothness values that can be misclassified as text, for example, in dark or high contrast regions. This problem can be dramatically reduced by using a smoothness threshold SMOOTH_THRESH that can be set to a high value to properly classify image data that may be misclassified as text and, conversely, a low value to properly classify text data that may be improperly classified as image data. This prevents the classification from flipping back and forth between image and text in borderline regions (i.e., regions in which the smoothness index values are nearly equal and are above and below a threshold value). For example, assume a single threshold of 6 and sample values of: 3 4 5 7 8 9 7 5 7 5 9 8 5 3 3. The resulting classifications as text (T) or image (I) are T T T I I I I T I T I I T T T, respectively. The smoothness index values of 7 5 7 5 9 represent a borderline region in which the classification switches between image and text. By employing a dual threshold scheme of requiring a smoothness index of 6 or greater to transition from text to image and a smoothness index of 4 or less to transition back to text, the classifications in the above case are T T T I I I I I I I I I T T and the unwanted switching between image and text is avoided. The two smoothness thresholds are applied on a per column basis. There is a threshold for each column of 32×1 pixel segments. The smoothness threshold SMOOTH_THRESH of the column of pixel line segments is initialized to the high value. If an image segment is found the smoothness threshold SMOOTH_THRESH for that column is set to the low threshold value. If text is again found in that column the smoothness threshold SMOOTH_THRESH of the column of pixel line segments is reset to the high value.

If the document 10 contains large text characters, for example, the text in a headline, some of the 32×1 pixel line segments are entirely inside the stem of a character. These segments have a smoothness index that causes them to be incorrectly classified as images. To avoid this problem, these segments are classified as text if the maximum luminance value L of the pixel line segment does not exceed a luminance threshold MAX_LUM_IN_CAP and the current pixel line segment is bounded by other text segments.

The edges of dark images can have the smoothness characteristics of text, because there is a single dark to light transition as with text, thereby leading to an incorrect text classification. This problem can be substantially prevented by applying the two thresholds described above in the horizontal direction in addition to the vertical direction. Being careful not to undo the fix for large text characters, a width test can be used to produce the desired result, because image areas are generally larger than most large text areas. If a group of adjacent of image segments is wider than a width threshold LONG_IMAGE_RUN the bounding pixel line segments that were classified as text are examined to see if they can be reclassified as image segments as described in more detail below.

FIGS. 7A–7D depict in more detail the process calculated values step 170 of FIG. 3. The processing described below is performed for each pixel line segment in a logical order, such as from the top left corner of a page to the bottom right corner of the page. Certain processing steps require previously processed pixel line segments to be reprocessed and such steps are described below. In step 700, the maximum non-neutral color of the pixel line segment is compared against a color threshold COLOR_THRESH. If the maximum non-neutral color is greater than or equal to the color threshold COLOR_THRESH, the current pixel line segment is classified as an image segment in step 710. Additionally in step 710, the smoothness threshold SMOOTH_THRESH for the column of pixel line segments is set to the low value, an image counter IMAGE_RUN_COUNT is incremented, and a capital text counter IN_CAPS is set to zero. The image run counter IMAGE_RUN_COUNT tracks the number of consecutive pixel line segments that are classified as images. The capital text counter IN_CAPS tracks the number of pixel line segments that could be in an area of large text, such as headlines. In step 720, if the image counter IMAGE_RUN_COUNT is equal to the long image run threshold IMAGE_RUN_THRESH, a number of previous pixel line segments are checked to see if they were improperly classified as text. If the image counter IMAGE_RUN_COUNT does not equal the long image threshold IMAGE_RUN_THRESH, the process proceeds to step 1000 and the next pixel line segment begins post processing at step 700.

A processing loop is established to check the classification of a limited number of previous pixel line segments in steps 740–760. In step 730, a counter N is set equal to the current pixel line segment number less the long image run threshold IMAGE_RUN_THRESH. The counter N is compared to zero in step 740. If the counter N is less than zero, the method proceeds to step 1000 and the next pixel line segment is processed beginning at step 700. If the counter N is greater than or equal to zero, the process continues to step 750 in which the average smoothness index of the current pixel line segment is compared to the low smoothness threshold value. If the average smoothness index is greater than or equal to the low smoothness threshold value, the process continues to step 760. If average smoothness index of pixel line segment N is less than the low smoothness threshold value, the process continues to step 1000 and the next pixel line segment is processed beginning with step 700. In step 760, the current pixel line segment is classified as an image segment, the counter N is decremented, the smoothness threshold of the column of the pixel line segments is set to the low value, and the process returns to step 740. In other words, the loop (defined by steps 740–760) checks previous pixel line segments to the left of the current pixel line segment to see if they are the edges of a dark image and were incorrectly classified as text. If so, the previous pixel line segments are re-classified as images.

If the maximum non-neutral color is less than the color threshold COLOR_THRESH, the process proceeds to step 770 and the average smoothness index of the current pixel line segment is compared to the smoothness threshold SMOOTH_THRESH of the current pixel line segment. The smoothness threshold of the column of the current pixel line segment is either be the low value or the high value as previously described. If the average smoothness index of the current pixel line segment is greater than or equal to the smoothness threshold SMOOTH_THRESH, the maximum luminance value of the pixel line segment is compared against the luminance threshold value MAX_LUM_IN_CAPS to determine if the pixel line segment could be in a region of large capital letters in step 780. If the maximum luminance value of the pixel line segment is less than or equal to the in-caps threshold MAX_LUM_IN_CAPS, the process proceeds to step 790. If the maximum luminance value of the pixel line segment is greater the luminance threshold MAX_LUM_IN_CAPS, the process proceeds to step 830 to set the capital text counter IN_CAPS to zero. The process continues to step 840, which is described below.

In step 790 if the capital text counter IN_CAPS is not equal to zero the capital text counter IN_CAPS is incremented in step 810 and the process continues to step 840 described below. If the capital text counter IN_CAPS is equal to zero, the process proceeds to step 800.

In step 800, if the current pixel line segment is not the first pixel line segment and the previous pixel line segment was classified as text and the minimum luminance value of the previous pixel line segment is less than or equal to the luminance threshold MAX_LUM_IN_CAPS, the process continues to step 820 to set the capital text counter IN_CAPS equal to one, otherwise the process proceeds to step 840. The current pixel line segment is classified as an image, the smoothness threshold SMOOTH_THRESH of the column of the current pixel segment is set to the low value, and the image run counter IMAGE_RUN_COUNT is incremented in step 840. In step 850, the image counter IMAGE_RUN_COUNT is compared to the long image run threshold IMAGE_RUN_THRESH. If the image counter IMAGE_RUN_COUNT is equal to the long image run threshold IMAGE_RUN_THRESH, a number of previous pixel line segments are checked to see if they were improperly classified as text. If the image counter IMAGE_RUN_COUNT does not equal the long image run threshold IMAGE_RUN_THRESH, the process proceeds to step 1000 and the next pixel line segment is processed at step 700.

In steps 870–890, a processing loop similar to the one depicted in steps 740–760 determines the classification of a limited number of previous pixel line segments. In step 860, a counter N is set equal to the current pixel line segment number less the long image run threshold IMAGE_RUN_THRESH. The counter N is compared to zero in step 870. If the counter N is less than zero, the method proceeds to step 900 in which the in-caps counter IN_CAPS is set equal to zero. Subsequently, the process proceeds to step 1000 where next pixel line segment is processed beginning at step 700. If the counter N is greater than or equal to zero, the process continues to step 880, in which the average smoothness index of the pixel line segment number N is compared to the low smoothness threshold value. If the average smoothness index of pixel line segment N is greater than or equal to the low smoothness threshold value, the process continues to step 890. If average smoothness index of pixel line segment N is less than the low smoothness threshold value, the process continues step 900 in which the capital text counter IN_CAPS is set equal to zero. Subsequently, the process proceeds to step 1000 in which next pixel line segment is processed beginning at step 700. In step 890, the pixel line segment corresponding to the counter value N is classified as an image segment, the counter N is decremented, the smoothness threshold of the column of the pixel line segment is set to the low value, and the process returns to step 870. In other words, the loop checks previous pixel line segments to the left of the current pixel line segment to see if they were incorrectly classified as text. If so, those pixel line segment are re-classified as image pixel line segments.

If the average smoothness index of the current pixel line segment is not greater than or equal to the smoothness threshold SMOOTH_THRESH, the process proceeds to step 910. A comparison of the long image run counter IMAGE_RUN_COUNT and the average smoothness index is performed in step 910. If the long image run counter IMAGE_RUN_COUNT is greater than or equal to the long image run threshold IMAGE_RUN_THRESH and the average smoothness index of the current segment is greater than or equal to the low smoothness threshold, the process continues to step 920. The current pixel line segment is classified as an image, and the smoothness threshold of the column of the pixel line segment is set to the low value in step 920. If either condition is not true, the process continues to step 930 in which a determination is made as to whether the capital text counter IN_CAPS is not equal to zero and the minimum luminance value of the pixel line segment is less than or equal to the luminance threshold MAX_LUM_IN_CAPS.

In step 930, if the capital text counter IN_CAPS is not equal to zero and the minimum luminance value of the pixel line segment is less than or equal to the luminance threshold MAX_LUM_IN_CAPS, the process continues to step 940. If the capital text counter IN_CAPS is equal to zero or the minimum luminance value of the pixel line segment is greater than the luminance threshold MAX_LUM_IN_CAPS, the process proceeds to step 970 described below.

In step 940, counter M is set to a value equal to the current pixel line segment number less the capital text counter IN_CAPS value. The process iterates through steps 950 and 960. The pixel line segment equal to the counter value M is classified as text and sets a left edge of the capital letter, the smoothness threshold of the column of the pixel line segment corresponding to counter value M is set to the high value, the counter M is incremented and the capital text counter value is decreased, in step 950. Subsequently, the capital text counter IN_CAPS is compared to zero, in step 960. If the capital text counter IN_CAPS is greater than zero, the process returns back to step 950. In other words, the processing loop extends capital text to the left and reclassifies those pixel line segments which were mistakenly classified as images, as text.

If the capital text counter is less than or equal to zero then the method proceeds to step 970. The pixel line segment is classified as text, the smoothness threshold of the column of the pixel line segment is set to high, and the image run counter IMAGE_RUN_COUNT is reset to zero, in step 970. Subsequently, the process continues to step 1000 and the next pixel line segment is processed beginning at step 700.

Having shown the preferred embodiments, one skilled in the art will realize that many variations are possible within the scope and spirit of the claimed invention. It is therefore the intention to limit the invention only by the scope of the claims.

What is claimed is:

1. A method for discriminating between textual content and graphical content in an image comprising:
    receiving a plurality of pixel values for a pixel line segment;
    calculating a plurality of spatial gradients based on pixel values of adjacent pixels;
    calculating a first statistical characteristic of the plurality of spatial gradients by squaring each of the spatial gradients to generate a plurality of squared gradients and summing the squared gradients;
    calculating a second statistical characteristic of the plurality of spatial gradients;
    dividing the second statistical characteristic by the first statistical characteristic to generate a smoothness index; and
    identifying the pixel line segment as one of a text segment or a graphic segment by comparing the smoothness index to a threshold value.

2. A method for discriminating between textual content and graphical content in an image comprising:
    receiving a plurality of pixel values for a pixel line segment;
    calculating a plurality of spatial gradients based on pixel values of adjacent pixels;
    calculating a first statistical characteristic of the plurality of spatial gradients;
    calculating a second statistical characteristic of the plurality of spatial gradients by determining an absolute value of each of the spatial gradients, summing the absolute gradients, and squaring the sum value;
    dividing the second statistical characteristic by the first statistical characteristic to generate a smoothness index; and
    identifying the pixel line segment as one of a text segment or a graphic segment by comparing the smoothness index to a threshold value.

3. A method for discriminating between textual content and graphical content in an image comprising:
    receiving a first plurality of pixel values for a pixel line segment and a second plurality of pixel values for the pixel line segment;
    calculating a plurality of spatial gradients for the pixel line segment based on the first plurality of pixel values of adjacent pixels;
    determining a smoothness index in response to the plurality of spatial gradients by calculating a first statistical characteristic of the plurality of spatial gradients by squaring each of the spatial gradients to generate a plurality of squared gradients; and summing the squared gradients; calculating a second statistical characteristic of the plurality of spatial gradients, and dividing the second statistical characteristic by the first statistical characteristic to generate the smoothness index,
    calculating a value by combining the second plurality of pixel values; and
    identifying the pixel line segment as one of a text segment or a graphic segment by comparing the smoothness index to a first threshold value and the calculated value of the second plurality of the pixel values to a second threshold value.

4. A method for discriminating between textual content and graphical content in an image comprising:
    receiving a first plurality of pixel values for a pixel line segment and a second plurality of pixel values for the pixel line segment;
    calculating a plurality of spatial gradients for the pixel line segment based on the first plurality of pixel values of adjacent pixels;
    determining a smoothness index in response to the plurality of spatial gradients by calculating a first statistical characteristic of the plurality of spatial gradients and calculating a second statistical characteristic of the plurality of spatial gradients by determining an absolute value of each of the spatial gradients, summing the absolute gradients; and squaring the sum value, and dividing the second statistical characteristic by the first statistical characteristic;
    calculating a value by combining the second plurality of pixel values; and
    identifying the pixel line segment as one of a text segment or a graphic segment by comparing the smoothness index to a first threshold value and the calculated value of the second plurality of the pixel values to a second threshold value.

5. An apparatus for discriminating between textual content and graphical content in an image comprising:
    a converter for receiving a plurality of pixel values for a pixel line segment;
    a separator module for:
    calculating a plurality of spatial gradients based on pixel values of adjacent pixels;
    calculating a smoothness index based on one or more statistical characteristics in response to the plurality of spatial gradients by calculating a first statistical characteristic of the plurality of spatial gradients by squaring each of the spatial gradients and summing the squared gradients, calculating a second statistical characteristic of the plurality of spatial gradients, and dividing the second statistical characteristic by the first statistical characteristic; and
    identifying the pixel line segment as one of a text segment or a graphic segment by comparing the smoothness index to a threshold value.

6. An apparatus for discriminating between textual content and graphical content in an image comprising:
    a converter for receiving a plurality of pixel values for a pixel line segment; a separator module for:
    calculating a plurality of spatial gradients based on pixel values of adjacent pixels;
    calculating a smoothness index based on one or more statistical characteristics in response to the plurality of spatial gradients by calculating a first statistical characteristic of the plurality of spatial gradients, calculating a second statistical characteristic of the plurality of spatial gradients by determining an absolute value of each of the spatial gradients, summing the absolute gradients and squaring the sum value, and dividing the second statistical characteristic by the first statistical characteristic; and identifying the pixel line segment as one of a text segment or a graphic segment by comparing the smoothness index to a threshold value.

* * * * *